US011481454B2

(12) United States Patent
Tremblay et al.

(10) Patent No.: US 11,481,454 B2
(45) Date of Patent: Oct. 25, 2022

(54) SEARCH ENGINE RESULTS FOR LOW-FREQUENCY QUERIES

(71) Applicant: Microsoft Technology Licensing, LLC, Redmond, WA (US)

(72) Inventors: Serge-Eric Tremblay, Pullman, WA (US); Vasileios Kandylas, Sunnyvale, CA (US); Omar Alonso, Redwood City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 614 days.

(21) Appl. No.: 15/612,242

(22) Filed: Jun. 2, 2017

(65) Prior Publication Data
US 2018/0349500 A1 Dec. 6, 2018

(51) Int. Cl.
G06F 16/00 (2019.01)
*G06F 16/9535* (2019.01)
*G06F 16/248* (2019.01)
*G06F 16/2457* (2019.01)
*G06F 16/9536* (2019.01)
G06F 16/30 (2019.01)

(52) U.S. Cl.
CPC ........ *G06F 16/9535* (2019.01); *G06F 16/248* (2019.01); *G06F 16/24578* (2019.01); *G06F 16/9536* (2019.01)

(58) Field of Classification Search
None
See application file for complete search history.

(56) References Cited

U.S. PATENT DOCUMENTS

| 7,610,287 B1 * | 10/2009 | Dean ................... H04L 12/1818 707/999.009 |
| 8,117,195 B1 * | 2/2012 | Dave .................... G06F 16/951 707/730 |
| 8,463,824 B2 * | 6/2013 | Sifry .................... G06F 16/285 707/804 |
| 8,478,735 B1 * | 7/2013 | Archambault ........ G06F 16/951 707/711 |
| 8,775,437 B2 | 7/2014 | Weitz et al. |
| 8,825,698 B1 | 9/2014 | Gong et al. |

(Continued)

OTHER PUBLICATIONS

Wang, et al., "ExpertRank: A topic-aware expert finding algorithm for online knowledge communities", In Journal of Decision Support Systems, vol. 54, Issue 3, Feb. 2013, pp. 1442-1451.

(Continued)

*Primary Examiner* — Polina G Peach
(74) *Attorney, Agent, or Firm* — Calfee, Halter & Griswold LLP

(57) ABSTRACT

Described herein are technologies relating to generating search results responsive to receipt of a query. More specifically, the query is mapped to a topic in response to receipt of a query, and social media accounts that have been labeled as being knowledgeable on the topic are identified. Messages in a message feed of the social media account that are germane to the topic are retrieved, and documents referenced (linked) in the retrieved messages are identified. These documents are positioned in a ranked list based upon the documents being referenced in the messages.

20 Claims, 9 Drawing Sheets

(56) References Cited

U.S. PATENT DOCUMENTS

| | | | | |
|---|---|---|---|---|
| 8,972,396 | B1* | 3/2015 | Zhang | G06F 16/3346 707/750 |
| 9,240,969 | B1* | 1/2016 | Jordan | H04L 51/32 |
| 9,324,112 | B2 | 4/2016 | Bailey et al. | |
| 10,019,589 | B1* | 7/2018 | Haugen | G06F 16/248 |
| 10,970,345 | B1* | 4/2021 | Ferrill | G06N 5/04 |
| 11,062,251 | B2* | 7/2021 | Garrity | G06F 3/0485 |
| 2007/0150465 | A1* | 6/2007 | Brave | G06F 16/9535 |
| 2011/0106895 | A1* | 5/2011 | Ventilla | G06Q 10/10 709/206 |
| 2011/0145348 | A1* | 6/2011 | Benyamin | G06F 16/951 709/206 |
| 2011/0246484 | A1 | 10/2011 | Dumais et al. | |
| 2013/0298038 | A1* | 11/2013 | Spivack | H04L 65/403 715/753 |
| 2014/0101267 | A1* | 4/2014 | Paparizos | G06Q 50/01 709/206 |
| 2014/0108535 | A1* | 4/2014 | Sheinfeld | H04L 67/22 709/204 |
| 2014/0136616 | A1* | 5/2014 | Smith, IV | H04L 67/22 709/204 |
| 2014/0289216 | A1* | 9/2014 | Voellmer | G06F 16/248 707/708 |
| 2015/0058310 | A1* | 2/2015 | Mukherjee | G06F 16/9535 707/706 |
| 2015/0081725 | A1* | 3/2015 | Ogawa | G06Q 50/01 707/754 |
| 2015/0100509 | A1 | 4/2015 | Pappas et al. | |
| 2016/0048556 | A1* | 2/2016 | Kelly | G06F 16/9535 707/767 |
| 2016/0070808 | A1* | 3/2016 | Imig | H04L 12/1818 707/706 |
| 2017/0011041 | A1 | 1/2017 | Frieden | |
| 2017/0344899 | A1* | 11/2017 | Zimmerman | G06N 20/00 |

OTHER PUBLICATIONS

Yeniterzi, et al., "Constructing Effective and Efficient Topic-Specific Authority Networks for Expert Finding in Social Media", In Proceedings of the first international workshop on Social media retrieval and analysis, Jul. 6, 2014, 6 pages.

Slawski, Bill., "Authority vs. Popularity in Search Engine Rankings", Retrieved At: «http://www.seobythesea.com/2011/10/authority-vs-popularity-in-search-engine-rankings/», Oct. 24, 2011, 43 pages.

* cited by examiner

SEARCH ENGINE RESULTS FOR LOW-FREQUENCY QUERIES

BACKGROUND

Search engines are configured to generate a ranked list of search results responsive to receipt of a query, wherein the search results include links to web pages that are identified by the search engine as being relevant to the query. A conventional search engine ranks web pages as a function of features of the query (e.g., keywords in the query, length of the query, etc.) and features of web pages (a number of links to a web page from other web pages, text in metadata of the web page, text in a title of the web page, etc.). A conventional search engine also contemplates ranking web pages based upon, for instance, engagement signals that are a function of user interaction with search results generated by the search engine. Exemplary engagement signals include: 1) how often users of the search engine select a link to a web page in search results generated by the search engine; 2) likelihood that a first-time user of the search engine will click on a link to the web page when included in search results (which can be estimated based upon previous user behavior), amongst other engagement signals. Using engagement signals in connection with ranking web pages (such as the engagement signals mentioned above) tends to be effective for ranking web pages in response to receipt of popular queries (queries submitted relatively often to the search engine). Less popular queries, typically referred to as "tail queries", however, are often not associated with sufficient engagement signals. In other words, a ranker of the search engine may be optimized for popular queries, potentially resulting in suboptimal performance when ranking web pages in response to receipt of a tail query.

SUMMARY

The following is a brief summary of subject matter that is described in greater detail herein. This summary is not intended to be limiting as to the scope of the claims.

Described herein are various technologies pertaining to positioning a document in a ranked list of documents responsive to receipt of a query based upon: 1) the query being mapped to a topic; and 2) a social media account labeled as being authoritative on the topic having referenced the document in a message of a message feed of the social media account. With more specificity, at least one server computing device receives messages in message feeds of numerous social media accounts, and the server computing device parses the messages to identify topics referenced in such messages. For example, the server computing device can identify topics based upon n-grams, named entities, hash tags, etc. in the messages. Responsive to the server computing device identifying a set of topics from the messages in the message feeds of the social media accounts, the server computing device can label, for a topic in the topics, one or more social media accounts as being authoritative on the topic. For instance, the server computing device can label a social media account as being authoritative on the topic based upon: 1) a number of messages generated by the social media account that reference the topic; 2) a number of unique contacts (e.g., followers) of the social media account; 3) a number of messages in the message feed of the social media account that are directed to the social media account by contacts thereof that reference the topic; 4) a number of contacts of the social media account that rebroadcast messages generated by the social media account that reference the topic; etc. In an example, for each topic in the topics, a ranked list of social media accounts can be mapped thereto in a database, wherein the ranking of the social media accounts can be based upon the factors referenced above (and potentially other factors). Thus, a database can be constructed that includes a list of topics, wherein at least one social media account is mapped to each topic, and further wherein the social media account is labeled as being authoritative on the topic.

This mapping of social media account to topic can be leveraged when ranking search results based upon a received query. With more specificity, a search engine receives a query and maps the query to a topic in the database referenced above. The search engine can utilize any suitable semantic analysis technique when mapping the query to the topic, including natural language processing (NLP) technologies, named entity recognition, and so forth. Responsive to mapping the query to the topic, the search engine identifies a social media account that is mapped to the topic in the database (e.g., the social media account that has been identified as being authoritative on the topic). The search engine can then filter out messages in the message feed of the social media account that are not relevant to the topic. Thereafter, the search engine can filter out messages that, while relevant to the topic, are not relevant to the specific intent of the query. Again, the search engine can employ any suitable semantic analysis technique to further filter out messages that are not relevant to the specific intent of the query.

Subsequently, the search engine can identify references to documents (e.g., web pages) in the remaining messages in the message feed. For example, a social media account labeled as being authoritative on the topic "climate change" may have a message in its message feed that includes a link to a web page about climate change. The search engine can boost the position of the web page in a ranked list of web pages based upon the fact that the social media account, which has been identified as being authoritative on the topic of "climate change", has a message in its message feed that includes a reference to a web page that is relevant to the received query. In other words, the search engine can position the web page in the ranked list of web pages based upon the web page being referenced in a message of the message feed of the social media account that has been identified as being authoritative on a topic to which the query has been mapped.

Also described herein are features pertaining to user exploration of topics and/or social media accounts. In an example, the search engine can return search results to a client computing device responsive to receipt of a query, wherein one of the search results is a link to a document that was referenced in a message of a social media feed of a social media account identified as being authoritative on a topic to which the query is mapped. The search result can include a first selectable graphic that is representative of the social media account and a second selectable graphic that represents the topic to which the query is mapped. When the user of the client computing device selects the graphic that is representative of the social media account, the search engine can return updated search results, wherein the updated search results include links to web pages that are referenced in messages of the message feed of the social media account. Further, the search engine may limit the updated search results to links that are also relevant to the topic. Alternatively, the updated search results include links to web pages referenced in messages of the message feed of the social media account based upon timestamps assigned to the messages (and without regard to the topic).

When the user of the client computing device selects the graphic that is representative of the topic to which the query is mapped, the search engine can generate updated search results and transmit these updated search results to the client computing device, wherein the updated search results include links to web pages referenced in messages of social media feeds of social media accounts that are mapped to the topic in the above-mentioned database (e.g., the social media accounts have been identified as being authoritative on the topic). Accordingly, the updated search results include links to web pages referenced in message feeds of social media accounts that have been identified as being authoritative on the topic, wherein such web pages are also identified as being relevant to the topic.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
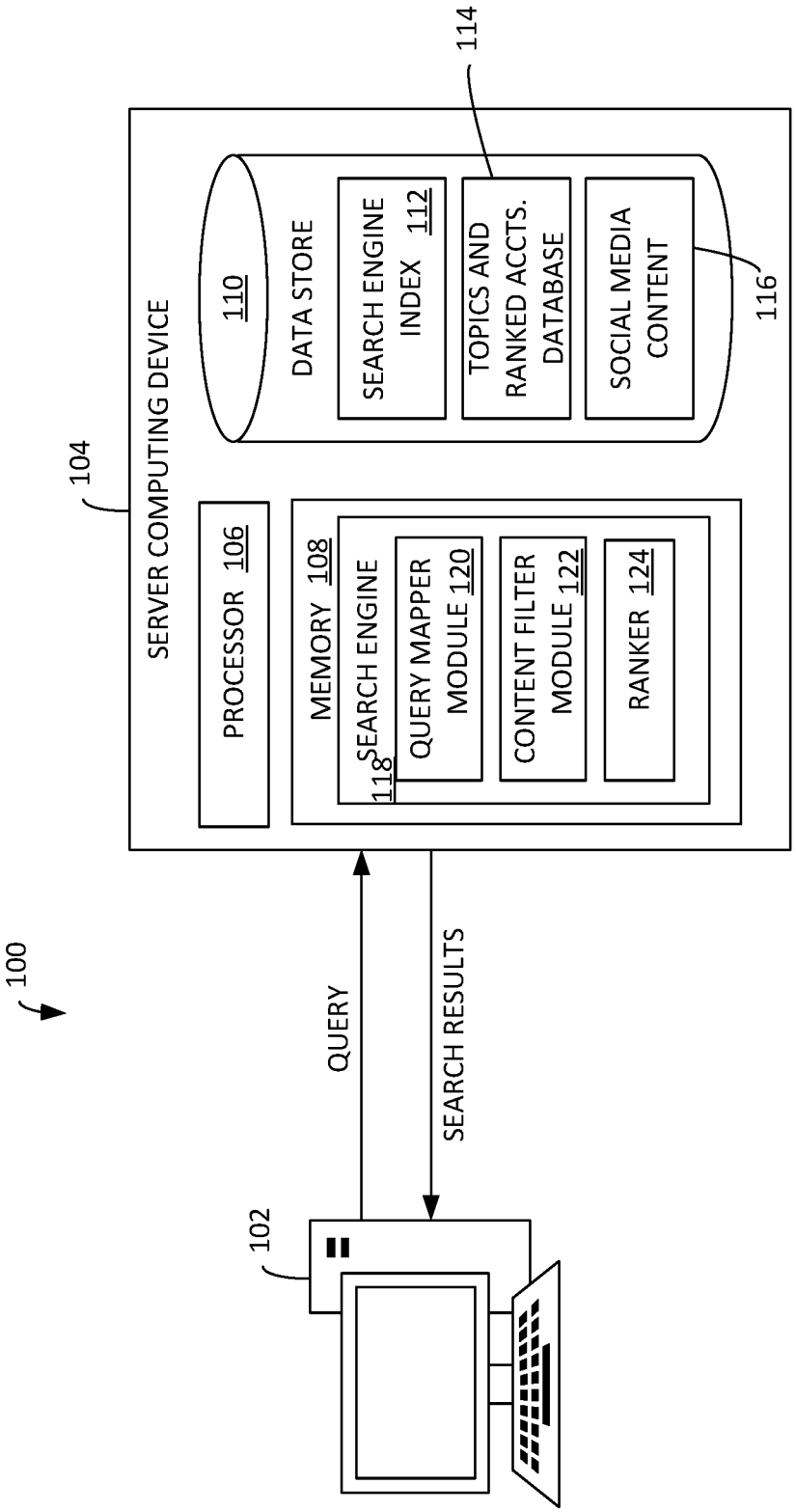
FIG. 1 is a functional block diagram of an exemplary system that is configured to position a document in a ranked list of documents based upon the document being referenced in a message of a message feed of a social media account.

Various technologies pertaining to generating search results responsive to receipt of a query are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Various technologies pertaining to generating search results responsive to receipt of a query are described herein. More particularly, a document is positioned in a ranked list of documents based upon a message in a message feed of a social media account referencing the document (e.g., including a link to the document), wherein the social media account has been identified as being authoritative on a topic to which the query has been mapped. For instance, an operator of the social media account may be a fan of the topic, an expert on the topic, etc. In other words, the fact that the social media account is authoritative on the topic is leveraged to position the document in a ranked list of documents responsive to receipt of the query, wherein the search results include links to documents in the ranked list of documents. Thus, a signal that was heretofore was unused when ranking documents can be employed to boost a position of a document in a ranked list of documents. The technologies described herein are particularly beneficial when a query submitted by a user of a client computing device is a long tail query, where there are a relatively small number of engagement signals that can be employed to rank documents responsive to receipt of the query.

With reference to FIG. 1, an exemplary system 100 that facilitates returning search results to a client computing device responsive to receipt of a query from the client computing device is illustrated. The system 100 includes a client computing device 102 that is in network communication with a server computing device 104. While FIG. 1 depicts the server computing device 104 as being a single computing device, it is to be recognized that the server computing device 104 can represent multiple computing devices that are in communication with one another (e.g., in a data center). The client computing device 102 may be a desktop computing device, laptop computing device, tablet (slate) computing device, mobile telephone, wearable computing device, a digital assistant device (e.g., a "smart" speaker), etc.

The server computing device 104 includes a processor 106, memory 108, and a data store 110, wherein the processor 106 is operatively coupled to the memory 108 and the data store 110. The data store 110 includes a search engine index 112, which indexes documents (e.g., web pages) by one or more keywords. The data store 110 also includes a topics and ranked accounts database 114, wherein such database 114 maps topics to social media accounts that have been identified as being authoritative on the topics. Thus, the topics and ranked accounts database 114 can include a list of topics, and each topic in the list can be mapped to at least one social media account in the database 114. In a nonlimiting example, each topic in the database 114 can be mapped to a ranked list of social media accounts, wherein a social media account estimated as being the most authoritative on the topic is placed in the uppermost position in the ranked list of social media accounts for the topic. The data store 110 also includes social media content 116, which can include messages in message feeds of social media accounts, documents referenced in messages in message feeds of the social media accounts, etc.

The memory 108 has a search engine 118 loaded therein. The search engine 118 is configured to return search results to client computing devices responsive to receipt of queries from the client computing devices. To that end, the search engine 118 includes a query mapper module 120 that is configured to map a received query to at least one topic included in the topics and ranked accounts database 114. The query mapper module 120 can utilize any suitable technique in connection with mapping a received query to a topic represented in the database 114. For example, the query mapper module 120 can perform a semantic analysis over keywords of the query to map the query to a topic. In another example, the query mapper module 120 can perform named entity recognition over keywords of a received query when mapping the query to a topic. In still yet another example, the query mapper module 120 can perform an n-gram analysis to map the query to a topic. There are numerous approaches for identifying one or more topics referenced in a query, and the query mapper module 120 can utilize one or more of these approaches when mapping queries to topics.

The search engine 118 also comprises a content filter module 122 that is configured to filter messages in the social media content 116 based upon the topic to which the query has been mapped by the query mapper module 120 and the information retrieval intent of the query. The search engine 118 also includes a ranker 124 that is configured to rank documents based upon references to the documents in messages included in the social media content 116.

Exemplary operation of the system 100 is now set forth. A user or a (proactive) digital assistant (not shown) of the client computing device 102 inputs a query to the client computing device (in the form of text, gesture, voice, etc.), and the client computing device 102 transmits the query to the server computing device 104. In a nonlimiting example, the user of the client computing device 102 can direct a web browser executed by the client computing device 102 to a uniform resource locator (URL) of a web page of the search engine 118, and can submit the query by way of a query field in the web page. In another example, the client computing device 102 can include a microphone, which generates a voice signal responsive to receipt of voice input from the user of the client computing device 102 (wherein the voice signal includes a query that is to be submitted to the search engine 118). The client computing device 102 can then transmit the voice signal (or features extracted from the voice signal) to the server computing device 104, which can decode the query included in the voice signal.

The search engine 118, responsive to receipt of the query, can execute a search over the search engine index 112 based upon the query to identify a plurality of documents that are potentially relevant to the query. Responsive to identifying the plurality of documents, the search engine 118 ranks the documents and generates search results that include ordered links to the documents, where the links are ordered in accordance with the ranking performed by the search engine 118.

The query mapper module 120 can map the query received from the client computing device 102 to a topic included in the topics and ranked accounts database 114. In an example, the received query may be "new information on climate change." The query mapper module 120, responsive to receipt of the query, can map the query to the topic "climate change" included in the topics and ranked accounts database 114. As described above, the query mapper module 120 can utilize any suitable technique in connection with mapping the received query to a topic in the topics and ranked accounts database 114. Further, in some cases, the query mapper module 120 can map a query to no topics or several topics.

As noted above, the topic (to which the query is mapped) is itself mapped to at least one social media account in the topics and ranked accounts database 114. The social media account may be an account for an entity (such as a business, a governmental body, a charitable organization, etc.) or a person. The content filter module 122, responsive to the query mapper module 120 mapping the received query to the topic, can identify the social media account mapped to the topic in the database 114, and can retrieve a subset of the social media content from the social media content 116, wherein the subset of the social media content is labeled as corresponding to the social media account. For instance, the social media content may include a message teed (for some defined window of time) for the social media account, wherein the message feed may include messages originated from the social media account and/or messages directed to the social media account by other social media accounts. Further, the social media feed for the social media account may be an aggregation of feeds from multiple social media accounts (from different social media applications), wherein the multiple social media accounts are operated by a same entity.

The content filter module 122 filters content from the of the above-mentioned subset of content for the social media account based upon the topic to which the query is mapped. For instance, messages in a social media feed of the social media account may include messages that are germane to the topic, as well as messages that are not germane to the topic. The content filter module 122 can filter messages from the social media feed of the social media account that are not relevant to the topic. Stated another way, the content filter module 122 can identify messages in the social media feed of the social media account that are relevant to the topic. In a nonlimiting example, the messages can be labeled with one or more topics a priori based upon semantic analysis of content of the messages, features of documents referenced in the messages, and so forth.

The content filter module 122 may then further filter these remaining messages based upon a specific intent of the received query. Continuing with the example set forth above (where the query is "new information on climate change"), the content filter module 122 may filter a message in the social media feed of the social media account that references a document with a publication date that is several years old. The content filter module 122 can then identify references to documents (e.g., links to web pages) in the remaining messages of the social media feed of the social media account. For instance, a message in the social media feed of the social media account may include a link to a web page on climate change. The content filter module 122 can output an identifier for this web page (e.g., a URL of the web page).

The ranker 124 can ascertain that the document identified by the content filter module 122 is included in the plurality of documents initially identified by the search engine 118 responsive to receipt of the query, and can boost the position of the document in a ranked list of documents based upon the document being referenced in the message of the social media feed of the social media account. More specifically, the ranker 124 is configured to order the plurality of documents in a ranked list of documents based upon a variety of features. One of the features that can be considered by the ranker 124 when positioning a document in the ranked list of documents is whether the document has been referenced in a message of a message feed of a social media account that has been identified as being authoritative on a topic to which the query has been mapped. The ranker 124 can further contemplate whether the social media account is operated by an entity or a person (wherein the ranker 124 may provide greater weight when the social media account is operated by an entity rather than a person). Moreover, the ranker 124 can consider a time when the message was posted to the message teed of the social media account, with greater weight being applied to messages posted more recently than messages posted further in the past.

The search engine 118, responsive to the ranker 124 ranking the plurality of documents in a ranked list of documents, can generate search results and transmit the search results to the client computing device 102. The search results can include links to documents, wherein the links are ordered in accordance with the ranked list output by the ranker 124.

Further continuing with the example query set forth above, as indicated previously, the query mapper module 120 can map the query "new information on climate change" to the topic "climate change". A social media account for former vice president Al Gore can be mapped to such topic in the database 114. The content filter module 122 may then search through messages in the message feed for the social media account for Al Gore to identify messages therein that are both relevant to the topic and to the specific intent specified in the query. Once such messages are identified by the content filter module 122, the content filter module 122 can output identities of documents referenced in these messages. Thus, a message in the message feed of a social media account of Al Gore may include a reference to a particular web page that pertains to climate change. The ranker 124 can ascertain that this web page is included in a plurality of web pages identified by the search engine 118 based upon the query, and can boost the position of the web page in a ranked list of web pages based upon the web page being referenced in the above-described message. In other words, the ranker 124 boosts the web page since someone authoritative on the topic of climate change (e.g., Al Gore) has referenced the web page in his social media feed. Further, more than one social media account that is authoritative on the topic may have a message in its message feed that references the web page; this is a stronger signal that can cause the web page to be boosted higher in the search results.

The search results returned to the client computing device 102 can include a search result that comprises a link to the web page, and the search result can further indicate that the web page is referenced in a message in a message feed of the social media account of Al Gore. For instance, the search result can include a selectable graphic that is representative of the social media account for Al Gore. Further, the search result may include a selectable graphic that is representative of the topic to which the received query is mapped. The user of the client computing device 102 may then choose to explore the topic and/or the social media account. For example, the user of the client computing device 102 can select the graphic that is representative of the social media account for Al Gore, and the client computing device 102 can transmit an indication that the user has selected the graphic to the search engine 118. The search engine 118, responsive to receiving such indication, can search through the social media content 116 for references to documents in messages in the social media feed for the social media account of Al Gore. The search engine 118 may then return updated search results to the client computing device 102, wherein the updated search results include links to documents referenced in messages of the message feed of the social media account for Al Gore. The search engine 118 can rank these search results using a variety of techniques. For instance, the search results can be ranked based upon time, wherein a document most recently referenced in a message of the message feed for the social media account for Al Gore is positioned at an uppermost position in the search results. In another example, the search engine 118 can rank the search results based upon relevance of the documents referenced in the search results to the query.

In another example, when the user of the client computing device 102 selects the graphic that is representative of the topic to which the query has been mapped, the search engine 118 can be configured to generated updated search results and transmit such search results to the client computing device 102, wherein the search results include links to documents referenced in messages of message feeds of social media accounts that are mapped to the topic in the database 114, For example, there may be several social media accounts mapped to the topic "climate change" in the database 114. The search engine 118, responsive to receiving an indication that the graphic representative of the topic has been selected by the user of the client computing device 102, can identify such social media accounts from the 114, and can further identify documents referenced in messages of message feeds of these social media accounts. The ranker 124 may rank the documents in any suitable manner, including based upon time, relevance to the topic, relevance to the initially provided query, and so forth.

Figure 2:
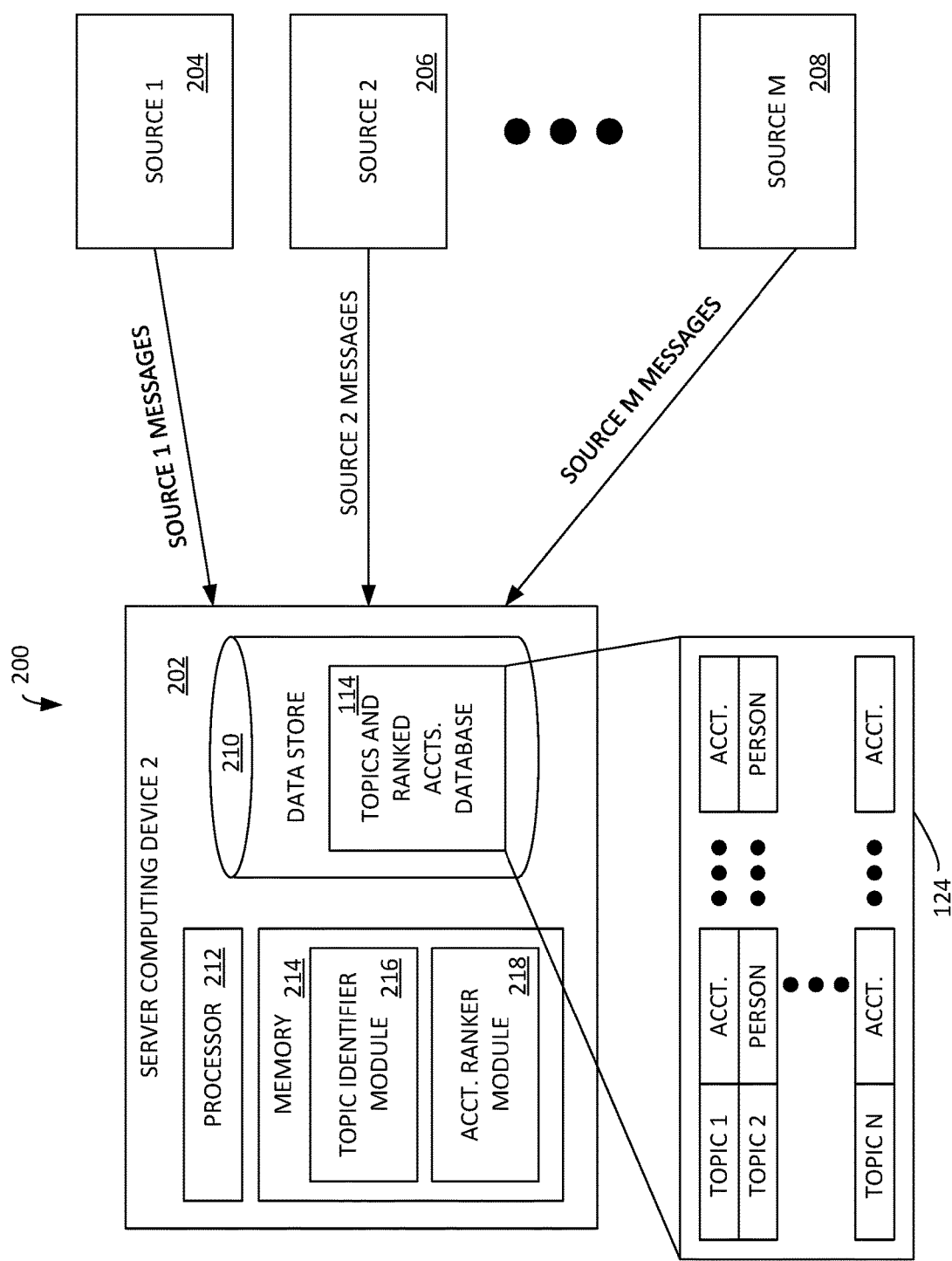
FIG. 2 is a functional block diagram of an exemplary system that is configured to construct a ranked list of social media accounts with respect to a topic.

Now referring to FIG. 2, an exemplary system 200 that facilitates constructing the topics and ranked accounts database 114 is illustrated. The system 200 includes a second server computing device 202 and a plurality of sources 204-208 that are in network communication with the second server computing device 202. The sources 204-208 may be or include server computing devices that execute social media applications, may be or include message board content, comments to articles, etc. Exemplary social media applications include, but are not limited to, a message broadcasting application, a photo sharing application, a message hosting application, and so forth. Additionally, social media applications, as the term is used herein, may also include applications that allow for user comments on products or services, weblog applications, etc. The second server computing device 202 includes a data store 210 that comprises the topics and ranked accounts database 114. The second server computing device 202 also includes a processor 212 and memory 214 that is operably coupled to the processor 212, wherein the memory 214 has a topic identifier module 216 and an account ranker module 218 loaded therein. The topic identifier module 216 is configured to identify topics referenced in messages of message feeds received from the sources 204-208. The account ranker module 218 is configured to rank social media accounts with respect to topics.

In operation, the second server computing device 202 receives messages from the sources 204-208. The second server computing device 202 can receive such messages periodically (e.g., the second server computing device 202 can pull the messages from the sources 204-208). In another example, the sources 204-208 may push the messages to the second server computing device 202. A message received from a source by the second server computing device 202 can include an identifier of at least one social media account to which the message is assigned. Further, the message may include content (e.g., text or images) and may also include a reference to a document (e.g., a link to a web page).

The topic identifier module 216, responsive to the second server computing device 202 receiving the message, can identify at least one topic that is referenced in the message. The topic identifier module 216 can utilize any suitable technique in connection with identifying the topic. For instance, the topic identifier module 216 can utilize natural language processing (NLP) techniques to analyze text of the message and can identify the topic referenced in the message based upon such NLP processing techniques. In another example, the topic identifier module 216 can identify n-grams in the message and can identify the topic based upon the identified n-grams. In yet another example, the topic identifier module 216 can employ named entity recognition techniques to identify named entities in the message and can identify the topic referenced in the message based upon the identified named entities. In still yet another example, the message may include a label generated by a creator of the message, such as a hash tag (e.g. #climatechange indicates that the message corresponds to the topic "climate change"). Therefore, for a message received from one of the sources 204-208, the topic identifier module 216 can assign at least one topic to the message.

The account ranker module 218, as indicated previously, can, for each topic identified by the topic identifier module 216, output a ranked list of social media accounts for the topic, wherein each social media account in the ranked list of social media accounts is identified as having knowledge about the topic (being authoritative on the topic). The account ranker module 218, for a topic in the topics identified by the topic identifier module 216, can generate a ranked list of social media accounts that are authoritative with respect to topic based upon one or more of the following parameters: 1) a number of mentions of other social media accounts by the social media account in messages labeled as being germane to the topic; 2) a number of unique social media accounts mentioned by the social media account in messages of the message feed of the social media account that are labeled as being germane to the topic; 3) a number of mentions of the social media account by other social media accounts in messages labeled as being germane to the topic; 4) a number of unique social media accounts that reference the social media account in messages labeled as being germane to the topic; and 5) a number of social media accounts that rebroadcast or "like" a message in the message feed of the social media account about the topic (e.g., if the social media feed of Al Gore includes a message about climate change and thousands of other accounts rebroadcast or "like" the message, then this is a signal that others consider Al Gore to be authoritative on the topic of climate change). For instance, the numbers referenced in 1)-5) above can be used to generate a score for the social media account for the topic, and the social media account can be positioned in the ranked list for the topic based upon such score.

The account ranker module 218 can set forth a threshold score, such that each social media account identified as being authoritative with respect to a topic has a score for the topic assigned thereto that is above the threshold score for the topic. As shown in FIG. 2, the topics and ranked accounts database 114 can include several topics (topic 1 through topic n), with each topic mapped to several social media accounts that have been identified as being authoritative on the topic. Hence, when a query is mapped to a topic, social media accounts labeled as being authoritative on the topic can be retrieved, such that messages in message feeds of the social media accounts can be searched for references to documents that may be relevant to the query.

The system 200 can be configured to periodically update the topics and ranked accounts database 114 as new topics emerge in messages of social media feeds, as different social media accounts are added and deleted, as different social media accounts become more or less authoritative on topics, and so forth. For instance, if a social media account is deleted, the database 114 can be updated to remove reference to the social media account from the database 114. Likewise, as a social media account becomes more authoritative on a topic (based upon, for example, the parameters referenced above), the social media account will become mapped to the topic in the database 114.

Figure 3:
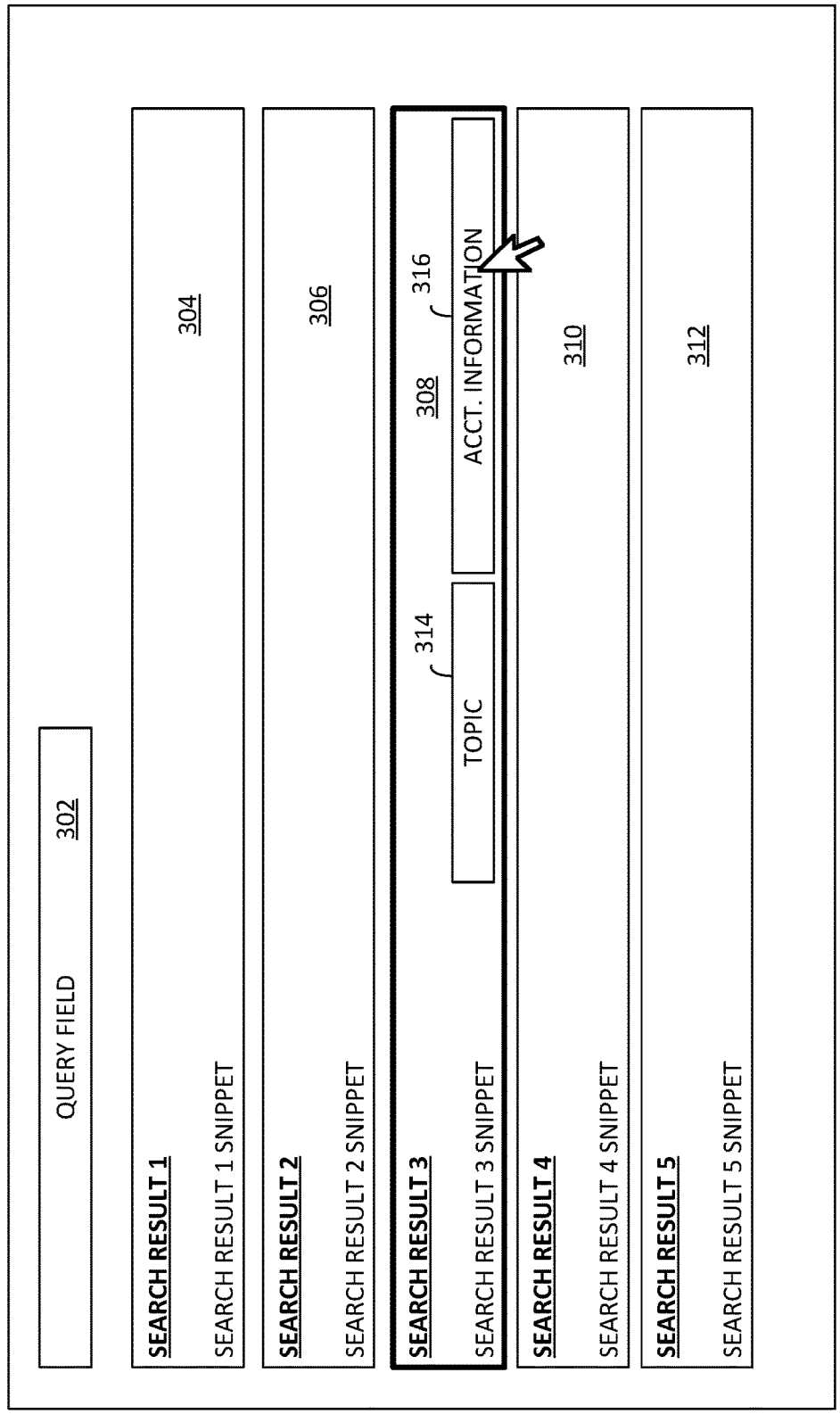
FIGS. 3-5 depict exemplary graphical user interfaces.

Now referring to FIG. 3, an exemplary graphical user interface that depicts a search results page 300 that can be presented on a display of the client computing device 102 is illustrated, where the search results page is transmitted to the client computing device 102 by the server computing device 104. The search results page 300 includes a query field 302, wherein a user of the client computing device 102 can set forth a query that is to be submitted to the search engine 118. The search results page 300 also includes a plurality of search results 304-312, wherein each search result includes a link to a web page that has been identified by the search engine 118 as being relevant to the query submitted to the search engine 118 by the client computing device 102.

In the search results page 300, the third search result 308 is highlighted to indicate that a social media account identified as being authoritative on the topic referenced in the query has a message in its message feed that references the web page represented by the third search result 308. Continuing with the exemplary query "new information on climate change", the third search result 308 can be highlighted to indicate that a message in a message feed of the social media account of Al Gore references the web page represented by the third search result 308.

The third search result 308 can also include a first graphic 314 that is representative of the topic to which the query is mapped by the query mapper module 120, and a second graphic 316 that is representative of the social media account that includes a message in its message feed that references the web page represented by the third search result 308. For example, the second graphic 316 may be a picture of an operator of the social media account, may include profile information about the social media account, etc. Further, the first graphic 314 and the second graphic 316 may be selectable by the user of the client computing device 102. As described previously, when, for example, the user of the client computing device 102 selects the second graphic 316, the search engine 118 can return updated search results to the client computing device 102, wherein the updated search results comprise links to web pages referenced in messages of the message feed of the social media account represented by the second graphic 316. Further, the third search result 308 may include some credential information pertaining to the social media account; for example, a social media account may be associated with a credential, such as "Company President." This information can be depicted, so that additional credibility is provided to the third search result 308. Moreover, the third search result 308 may be further boosted due to the credential being associated with the social media account.

Figure 4:
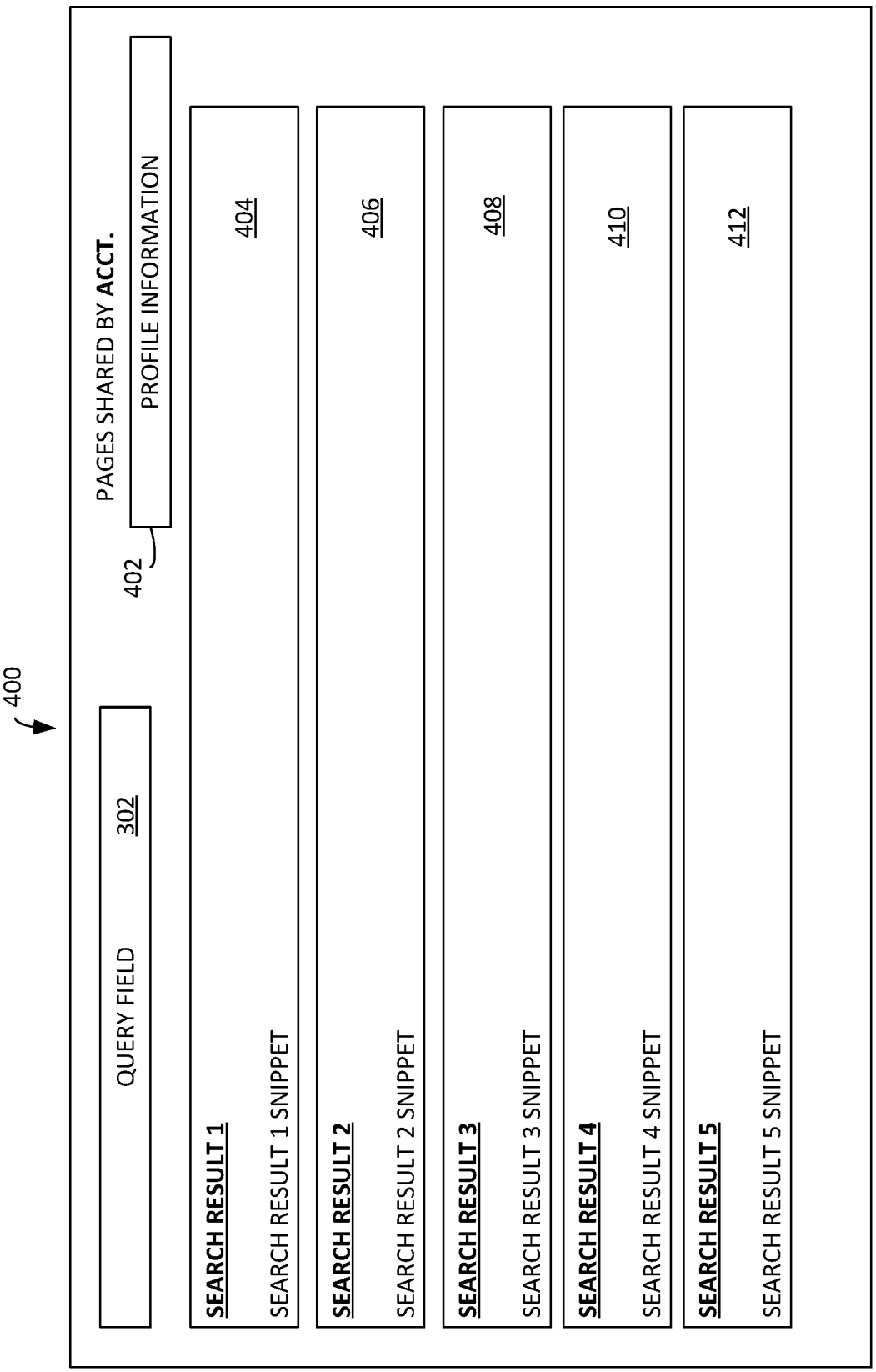

Turning now to FIG. 4, another exemplary graphical user interface of a search results page 400 that can be presented on the display of the client computing device 102 is illustrated. The search results page 400 includes the updated search results 404-412, where the search results 404-412 represent a web page referenced in a message of a message feed of the social media account represented by the second graphic 316. Each search result can include a selectable title, as well as a snippet that summarizes content of the web page represented by the search result. The search results page 400 additionally includes profile information 402 for the social media account. For example, the profile information 402 may include an image of Al Gore, biographical information pertaining to Al Gore, etc. The search results 404-412, as described previously, include links to web pages referenced in messages of the message feed of the social media account. The search results 404-412 can be ranked in any suitable manner. For example, the search results 404-412 can be ranked based upon timestamps assigned to messages that reference the web pages represented by the search results 404-412. In another example, the search results 404-412 can be ranked based upon a computed metric of relevance to the topic to which the query is mapped. In still yet another example, the search results 404-412 can be ranked as a function of their relevance, generally, to the query. In another example, the search results 404-412 can be ranked based upon user engagement with messages that reference the web pages represented by the search results. For instance, continuing with the example set forth above, the message feed for Al Gore may include several messages about a topic, where the messages include links to web pages. Users may engage with one of those messages more than others for instance, users may "like" a message in the messages more than others, may click on a link in the message more than others, etc. Accordingly, the document referenced in the message can be included higher in the search results 404-412 than documents referenced in messages that were engaged with less than the message.

Figure 5:
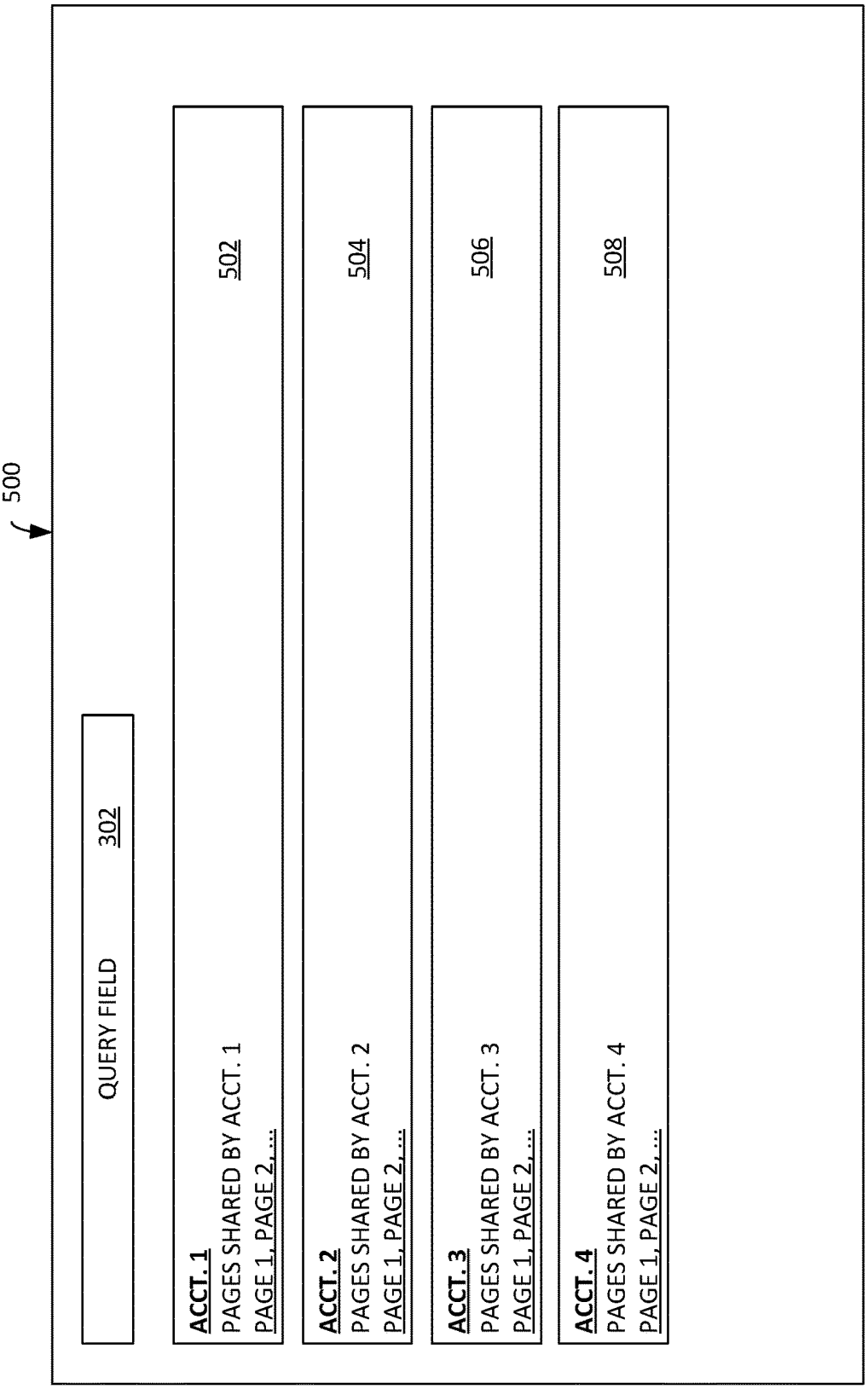

Now referring to FIG. 5, a graphical user interface of another exemplary search results page 500 is illustrated. For instance, rather than returning web pages, the search engine 118 can be configured to return a list of social media accounts that are relevant to the topic. With more particularly, the search engine 118 can operate as described above, creating a ranked list of web pages. Using that ranked list of web pages, the search engine 118 can identify social media accounts (who have been identified as being authoritative on the topic) whose message feed includes a message that referenced the topic. The search engine 118 may then construct a ranked list of social media accounts that corresponds to the position of the documents in the ranked list of documents. Thus, for instance, referring briefly to FIG. 3, since the document represented by the third search result was referenced in a message in the message feed of the social media account of Al Gore, a first search result 502 in the search results page 500 may be a link to the social media account of Al Gore. The first search result 502 may also include a list of pages referenced in messages of the message feed of the social media account of Al Gore that have been identified as being germane to the topic. The user of the client computing device 102, then, can select the link to the social media account in the first search result 502, whereupon a search results page similar to that shown in FIG. 4 can be presented on the display of the client computing device 102. In another example, the user of the client computing device 102 can select one of the pages represented in the first search result 502, which would result in the selected page being transmitted to the client computing device 102. The search engine results 500 include second through fourth search engine results 504-508, each of which represents a social media account.

Figure 6:
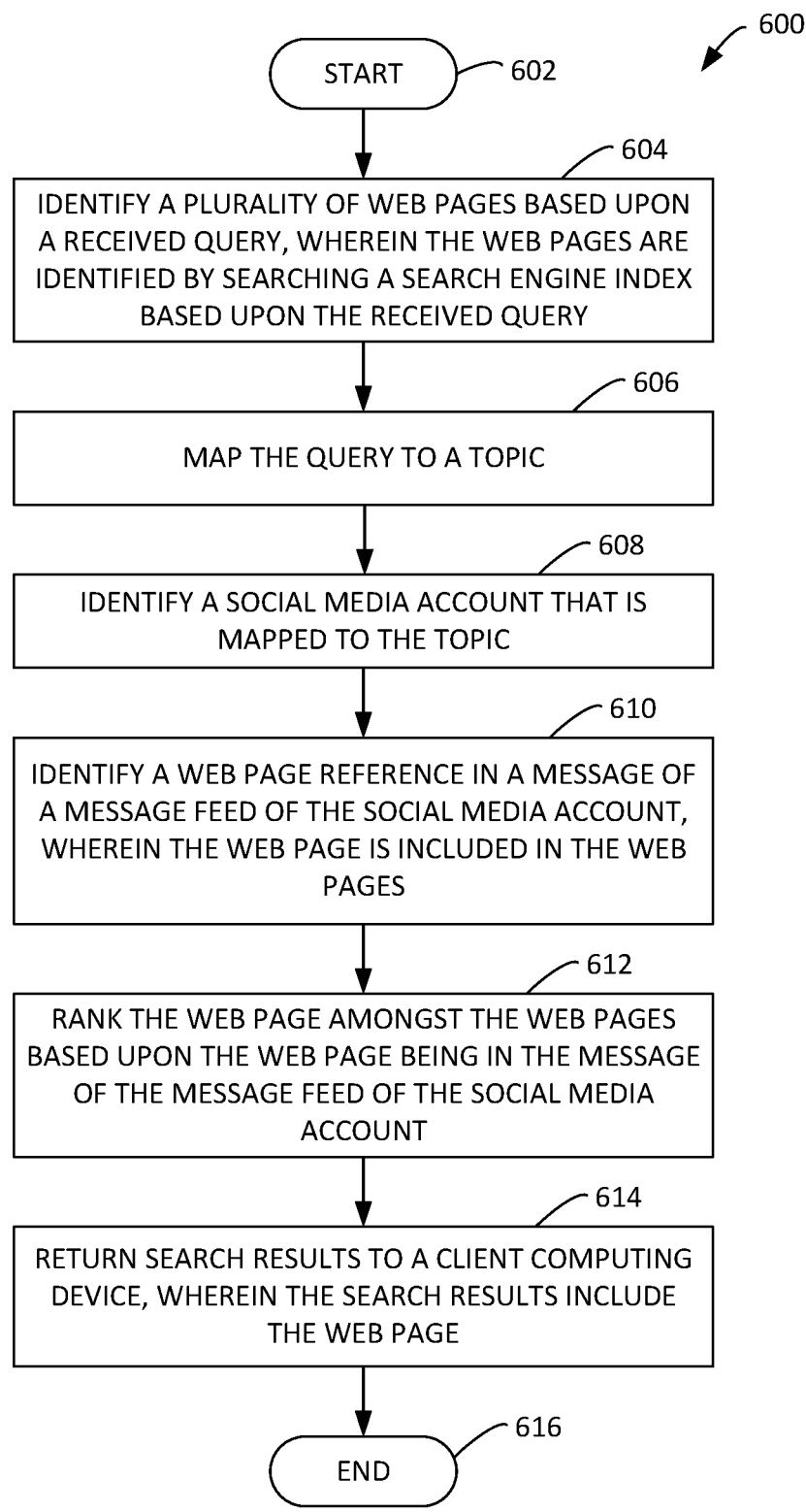
FIG. 6 is a flow diagram that illustrates an exemplary methodology for returning search results to a client computing device responsive to receipt of a query from the client computing device.
Figure 7:
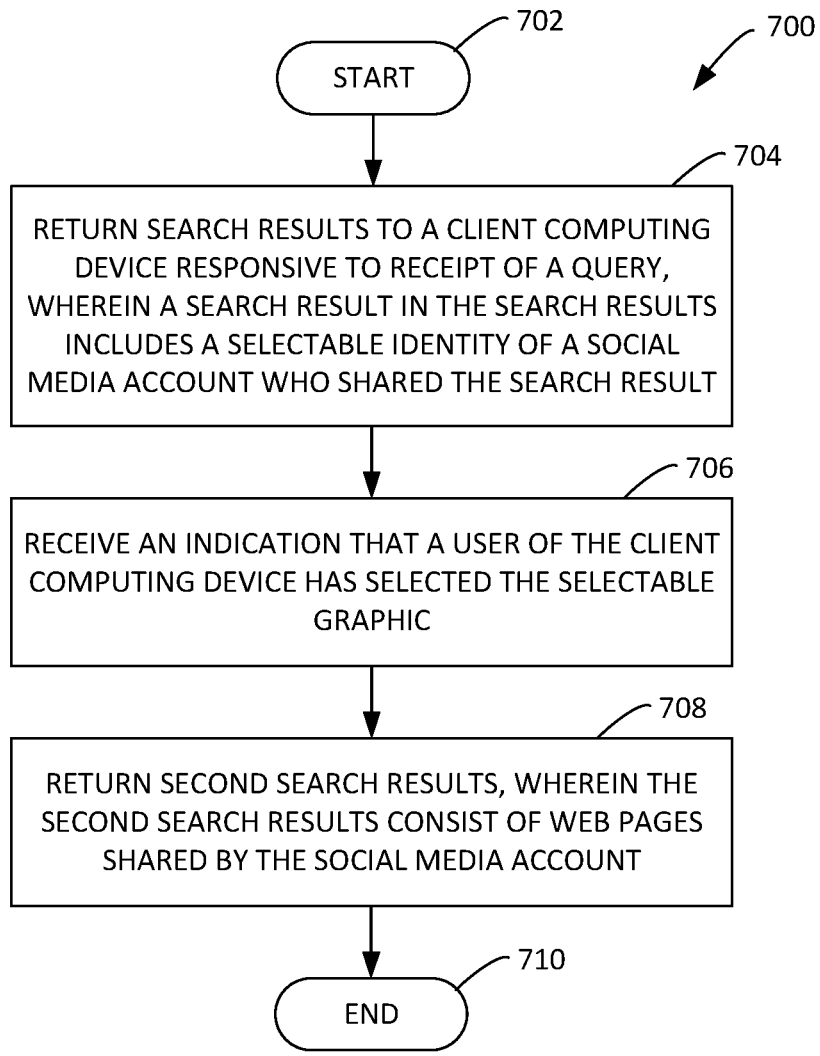
FIG. 7 is a flow diagram that illustrates an exemplary methodology for returning search results to a client computing device responsive to receipt of an indication that a user of the client computing device has selected a selectable identifier for a social media account.
Figure 8:
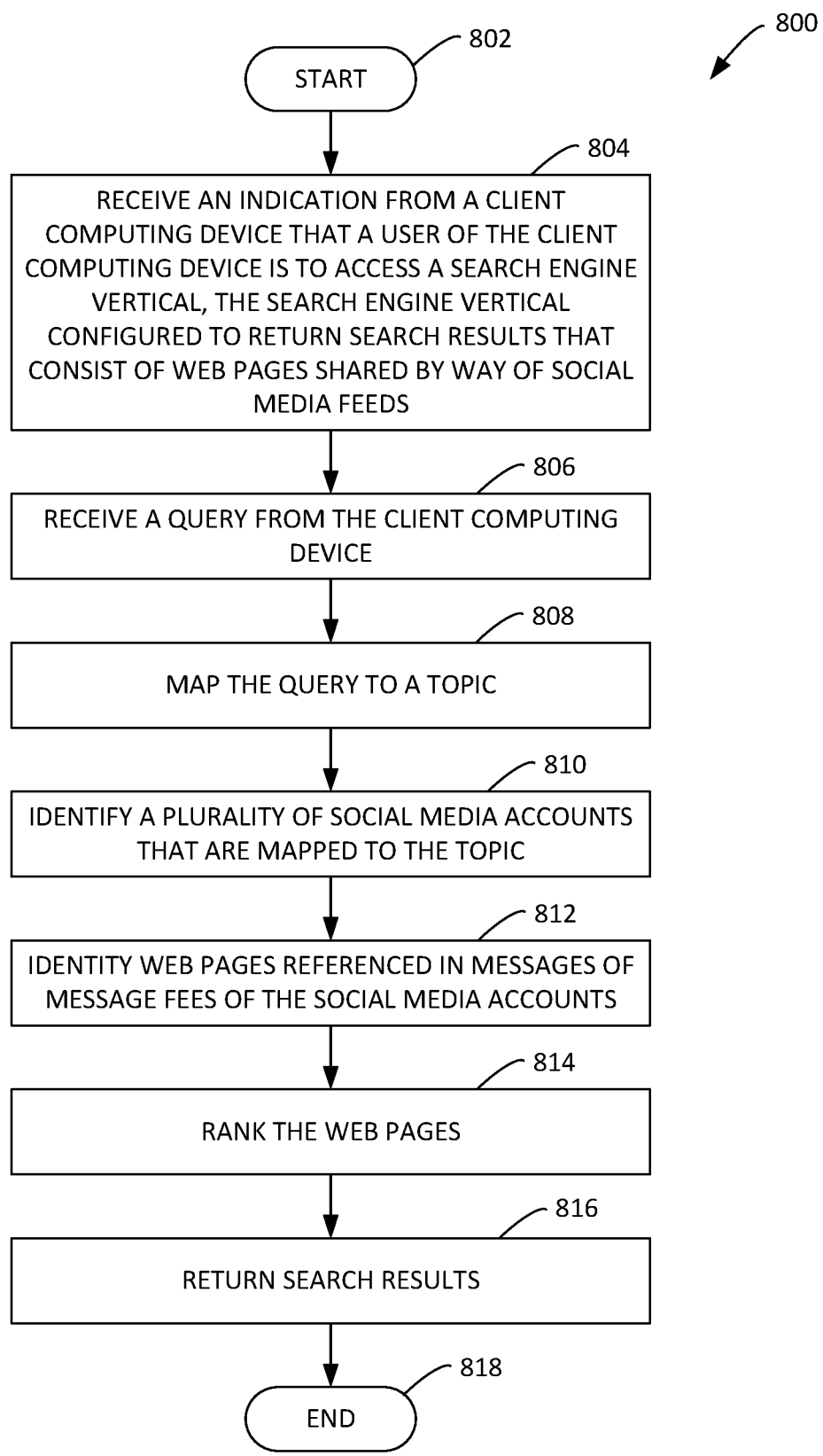
FIG. 8 is a flow diagram illustrating an exemplary methodology for returning search results to a client computing device responsive to receipt of a query from the client computing device.

FIGS. 6-8 illustrate exemplary methodologies relating to ranking search results based upon content of social media messages. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 6, an exemplary methodology 600 that facilitates returning a ranked list of search results responsive to receipt of a query is illustrated. The methodology 600 is executed at a server computing device, and starts at 602. At 604, a plurality of web pages is identified based upon a received query, wherein the web pages are identified by searching a search engine index based upon the received query. At 606, the query is mapped to a topic, and at 608, a social media account that is mapped to the topic in a database is identified. As described previously, the social media account has been identified as being authoritative on the topic to which the query has been mapped at 606. Further, it is to be noted that several social media accounts can mapped to the topic, and thus identified at 606.

At 610, a web page that is referenced in a message of a message feed of the social media account is identified, wherein the web page is included in the web pages identified at 604. As described previously, the message that includes the web page can be identified as being relevant to the topic and further relevant to the information retrieval intent of the query. It is to be understood that several web pages can be identified at 610, wherein the web pages are referenced in messages of social media feeds of the social media accounts identified at 606.

At 612, the web page is ranked amongst the plurality of web pages based upon the web page being referenced in the message in the message feed of the social media account. That is, a position of the web page in the ranked list of web pages is boosted based upon the web page being referenced in the message of the message feed of the social media account. At 614, search results are returned to the client computing device, wherein the search results include a link to the web page that is positioned in accordance with the rank of the web page determined at 612. The methodology 600 completes at 616.

Now referring to FIG. 7, an exemplary methodology 700 that facilitates returning search results to a client computing device that submitted a query based upon a user of the client computing device indicating an intent to pivot about a social media account is illustrated. The methodology 700 is executed at a server computing device, and starts at 702. At 704, search results are returned to a client computing device responsive to receipt of a query, wherein a search result in the search results includes a selectable graphic that is representative of a social media account that shared a web page represented by the search result. At 706, an indication is received that a user of the client computing device has selected the selectable graphic. At 708, second search results are returned to the client computing device, wherein the second search results consist of links to web pages shared by the social media account. The methodology 700 completes at 710.

Referring now to FIG. 8, an exemplary methodology 800 for returning search results responsive to receipt of a query is illustrated. The methodology 800 is executed at a server computing device, and starts at 802. At 804, an indication is received from a client computing device that a user of the client computing device wishes to access a search engine vertical. The search engine vertical is configured to return search results that consist of web pages shared by way of messages in social media feeds of social media applications. Accordingly, the search engine vertical, rather than performing a general web search, limits its search to web pages that have been referenced in messages of message feeds of social media applications that have been identified as being authoritative on a topic to which the query is mapped. With more specificity, at 806, a query from the client computing device is received, and at 808, the query is mapped to a topic from amongst a predefined list of topics.

At 810, a plurality of social media accounts that are mapped to the topic are identified, and at 812, web pages referenced in messages of message feeds of the plurality of social media applications are identified. At 814, the web pages identified at 812 are ranked (utilizing any suitable ranking algorithm), and at 816, search results are returned to the client computing device, wherein the search results are ordered in accordance with the rank of the web pages ascertained at 814, and further wherein the search results include links to such web pages. The methodology 800 completes at 818.

Figure 9:
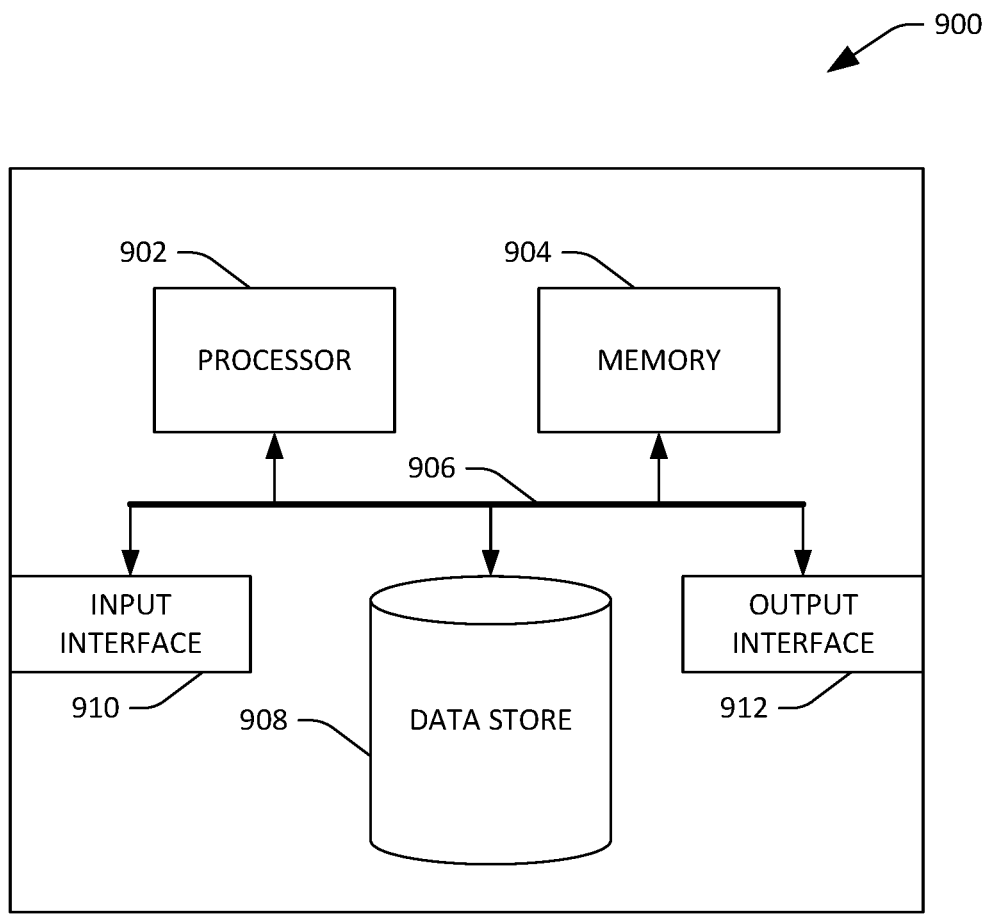
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that supports mapping queries to topics. By way of another example, the computing device 900 can be used in a system that supports identifying web pages referenced in social media messages. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store message feeds of social media accounts, a database that maps topics to social media accounts, etc.

The computing device 900 additionally includes a data store 908 that is accessible by the processor 902 by way of the system bus 906. The data store 908 may include executable instructions, the above-mentioned database, social media content, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, RUM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   at least one processor; and
   memory storing instructions that, when executed by the at least one processor, cause the at least one processor to perform acts comprising:
   receiving a query from a client computing device that is in network communication with the computing system, wherein the query comprises a keyword, and further wherein web pages are identified based upon the query;
   responsive to receiving the query, and based upon a keyword in the query, mapping the query to a topic in a predefined list of topics;
   responsive to mapping the query to the topic, identifying a social media account that is mapped to the topic in a database, wherein the social media account is mapped to the topic due to the social media account belonging to an entity that has been previously identified as having expertise on the topic;
   responsive to identifying the social media account, identifying a web page that is referenced in a message of a message feed of the social media account;
   determining that the web page that is referenced in the message of the message feed of the social media account is included in the web pages previously identified based upon the query;
   ranking the web pages that were previously identified based upon the query to form an ordered list of web pages, wherein the web page is positioned in the ordered list of web pages based upon the web page being referenced in the message of the message feed of the social media account and further based upon the web page being included in the web pages previously identified based upon the query; and
   transmitting search results to the client computing device for presentment on a display of the client computing device, wherein the search results include selectable links to the web pages, the links are ordered in the search results in accordance with the ordered list of web pages.

2. The computing system of claim 1, wherein mapping the query to the topic comprises identifying a named entity in the query, wherein the named entity is the topic.

3. The computing system of claim 1, wherein several social media accounts are mapped to the topic in the database, the social media accounts are ranked for the topic, and further wherein the social media account is a top-most ranked social media account for the topic from amongst the social media accounts.

4. The computing system of claim 1, the acts further comprising:
   mapping the social media account to the topic in the database, wherein mapping the social media account to the topic comprises:
   identifying a second message in the message feed;
   determining that the second message references the topic; and
   mapping the social media account to the topic based upon the determination that the message in the message feed references the topic.

5. The computing system of claim 4, wherein mapping the social media account to the topic further comprises:
   counting a number of messages in the message feed that are labeled as referencing the topic; and
   mapping the social media account to the topic based upon the number of messages in the message feed that are labeled as referencing the topic.

6. The computing system of claim 1, wherein identifying the web page comprises determining that the social media account has shared the web page in the message feed.

7. The computing system of claim 1, wherein the message in the message feed is directed to the social media account from another social media account.

8. The computing system of claim 1, wherein a search result in the search results that represents the web page is labeled as being shared by the social media account, and further wherein the search result includes a selectable link for the social media account, the acts further comprising:
   receiving an indication that a user of the client computing device has selected the selectable link for the social media account;
   responsive to receiving the indication, identifying a second plurality of web pages, wherein the web pages in the second plurality of web pages are referenced in messages in the social media feed of the social media account;
   ranking the second plurality of web pages to form a second ordered list of web pages, wherein the second plurality of web pages are ranked based upon a feature of the second plurality of web pages; and
   transmitting second search results to the client computing device responsive to ranking the second plurality of web pages, wherein the second search results include second selectable links to the second plurality of web pages, the second selectable links ordered in the second search results in accordance with the second ordered list of web pages.

9. The computing system of claim 8, wherein the second search results further include graphics that indicate that the selectable search results correspond to web pages referenced in messages of the message feed of the social media account.

10. The computing system of claim 8, wherein the feature is a timestamp assigned to each message in the message feed that referenced one of the web pages in the second plurality of web pages such that a topmost link in the second search results is referenced in a message in the message feed that has an earliest timestamp assigned to the message from amongst timestamps assigned to messages that include references to the web pages in the second plurality of web pages.

11. A method executed at a server computing device, the method comprising:
- receiving a query from a client computing device;
- responsive to receiving the query, identifying documents from a document collection as being relevant to the query;
- mapping the query to a topic from amongst a plurality of potential topics;
- responsive to mapping the query to the topic, identifying a social media account, wherein the social media account is identified due to the social media account being labeled as being authoritative on the topic, and further wherein the social media account has a message feed that includes messages;
- responsive to identifying the social media account, identifying that a message in the message feed includes a link to a document in the documents that were previously identified as being relevant to the query;
- subsequent to identifying that the message in the message feed includes the link to the document, ordering the documents in a ranked list, wherein a position of the document in the ranked list is based upon the message in the message feed comprising the link to the document; and
- transmitting search results to the client computing device responsive to ordering the documents, wherein the search results include links to the documents and are ordered in accordance with the ranked list.

12. The method of claim 11, wherein the documents are web pages, and wherein the link to the document in the message comprises a uniform resource locator for the document.

13. The method of claim 11, wherein the social media account represents an entity.

14. The method of claim 13, wherein the position of the document in the ranked list is further based upon the social media account representing an entity rather than an individual.

15. The method of claim 11, further comprising:
- receiving the messages in the message feed;
- identifying at least one of:
  - a number of messages in the message feed that reference the topic; or
  - a number of times that messages that reference the topic in the message feed have been rebroadcast by other social media accounts; and
- labeling the social media account as being authoritative on the topic based upon at least one of the number of messages in message feed that reference the topic or the number of times that messages in the message feed have been rebroadcast by other social media accounts.

16. The method of claim 15, wherein identifying that the message of the message feed includes the link to the document comprises:
- determining that content of the message in the message feed is germane to the topic based upon content of the message; and
- identifying the link to the document in the message only after determining that the content of the message is germane to the topic.

17. The method of claim 11, wherein a search result in the search results comprises:
- a link to the document; and
- a selectable graphic, wherein the selectable graphic identifies the social media account.

18. The method of claim 17, further comprising:
- receiving an indication that a user of the client computing device has selected the selectable graphic; and
- responsive to receiving the indication, generating second search results, wherein the second search results consist of links to documents referenced in a subset of the messages of the message feed.

19. The method of claim 18, wherein the links to the documents in the second search results are ordered based upon timestamps assigned to the subset of the messages in the message feed.

20. A computer-readable storage medium comprising instructions that, when executed by at least one processor, cause the at least one processor to perform acts comprising:
- receiving a query from a client computing device;
- generating search results responsive to receipt of the query, wherein the search results include an ordered list of links to web pages; and
- transmitting the search results to the client computing device, wherein generating the search results comprises:
  - searching a search engine index based upon the query;
  - identifying web pages that are relevant to the query based upon the searching of the search engine index;
  - identifying a topic referenced in the query;
  - responsive to identifying the topic referenced in the query, identifying a social media account, wherein the social media account is identified due to the social media account being labeled as being authoritative on the topic;
  - determining that a message in a message feed of the social media account is relevant to the query;
  - identifying a link to a web page in the message;
  - determining that the web page in the message is included in the web pages previously identified as being relevant to the query; and
  - positioning the web page in a ranked list of web pages based upon the web page referenced in the message being included in the web pages previously identified as being relevant to the query, wherein the ordered list of links of the search results corresponds to the ranked list of web pages.

* * * * *